United States Patent
Musa et al.

(10) Patent No.: US 11,072,675 B2
(45) Date of Patent: Jul. 27, 2021

(54) POLYMERS HAVING N-VINYL AMIDE AND HYDROXYL MOIETIES, THEIR COMPOSITIONS AND THE USES THEREOF

(71) Applicant: ISP INVESTMENTS LLC, Wilmington, DE (US)

(72) Inventors: Osama M. Musa, Bedminster, NJ (US); Cuiyue Lei, Wayne, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 38 days.

(21) Appl. No.: 16/125,176

(22) Filed: Sep. 7, 2018

(65) Prior Publication Data

US 2019/0071529 A1    Mar. 7, 2019

Related U.S. Application Data

(62) Division of application No. 13/258,236, filed as application No. PCT/US2010/028681 on Mar. 25, 2010, now Pat. No. 10,400,052.

(Continued)

(51) Int. Cl.
*C08F 226/06* (2006.01)
*C09K 8/52* (2006.01)
*C09K 8/22* (2006.01)

(52) U.S. Cl.
CPC .............. *C08F 226/06* (2013.01); *C09K 8/52* (2013.01); *C09K 2208/22* (2013.01)

(58) Field of Classification Search
None
See application file for complete search history.

(56) References Cited

U.S. PATENT DOCUMENTS 4,913,824 A    4/1990 Kneller
6,177,497 B1 *    1/2001 Klug .................. C09K 8/52
                                                            524/376

(Continued)

OTHER PUBLICATIONS

Insternational Search Report of PCT/US10/28681 Published on Oct. 14, 2010.

*Primary Examiner* — Jeffrey D Washville
(74) *Attorney, Agent, or Firm* — William J. Davis; Nathalie Tietcheu (57) ABSTRACT

The invention relates to polymers derived at least from one: (A) one N-vinyl amide unit, and (B) one hydroxyl-containing acrylate unit, and to polymers derived at least from: (A) N-vinyl-2-caprolactam, and (B) one non-acrylate unit having: (i) at least one hydroxyl group, and/or (ii) at least one functional group convertible to a hydroxyl group wherein at least one group is converted to hydroxyl functionality in the final polymer product. Such polymers may exhibit degradability, e.g., in seawater or soil environments. In preferred embodiments, these polymers and compositions thereof are used in oilfield applications, such as an inhibitor of gas hydrates and/or a kinetic inhibitor of gas hydrates. The polymer can assume alternating, block, and/or random configurations of the repeating units, with at least one ester group. The chemical structure subscripts m, and n may be any integer equal to or greater than 1.

(Continued)

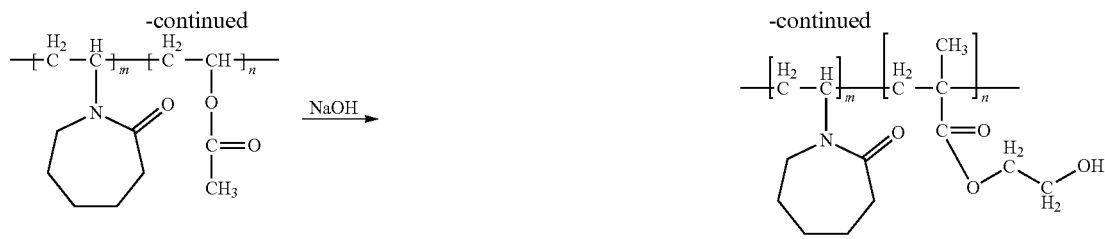

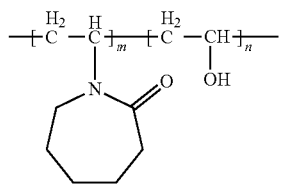

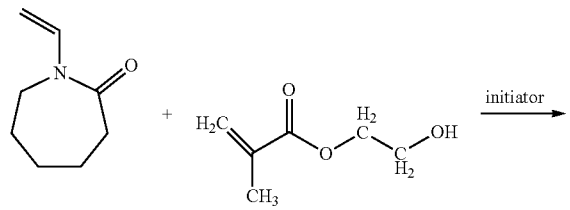

5 Claims, 2 Drawing Sheets

Related U.S. Application Data (60) Provisional application No. 61/165,036, filed on Mar. 31, 2009.

(56) References Cited

U.S. PATENT DOCUMENTS

| | | | |
|---|---|---|---|
| 6,319,971 B1 * | 11/2001 | Kelland | C09K 8/52 524/379 |
| 6,417,417 B1 * | 7/2002 | Sinquin | C09K 8/52 585/15 |
| 2005/0215740 A1 * | 9/2005 | Nakata | C08F 26/02 526/217 |
| 2008/0255326 A1 * | 10/2008 | Widmaier | C08F 283/06 526/79 |

* cited by examiner

POLYMERS HAVING N-VINYL AMIDE AND HYDROXYL MOIETIES, THEIR COMPOSITIONS AND THE USES THEREOF

FIELD OF THE INVENTION

The invention relates to polymers derived at least from one: (A) one N-vinyl amide unit, and (B) one hydroxyl-containing acrylate unit, and to polymers derived at least from: (A) N-vinyl-2-caprolactam, and (B) one unit having: (i) at least one hydroxyl group, and/or (ii) at least one functional group convertible to a hydroxyl group wherein at least one group is converted to hydroxyl functionality in the final polymer product.

Also described are compositions comprising the polymers.

In preferred embodiments, these polymers and compositions thereof are used in oilfield applications, such as an inhibitor of gas hydrates. The polymer can assume alternating, block, and/or random configurations of the repeating units, with at least one ester group.

DESCRIPTION OF THE PRIOR ART

The extraction and fluid transport of oil and natural gas present many challenges. Of primary concern in this invention is the inhibition of gas hydrate formation in the extraction pipeline. It is well known that the presence of water in the hydrocarbon-containing line can facilitate the formation of gas hydrate crystals, which can block the conduit and/or compromise the integrity of the construction materials. Lower molecular weight hydrocarbon gases such as methane, ethane, propane, butane, and isobutane are especially prone to the formation of gas hydrates. Elevated pressures and low temperatures aide interactions between the dissolved hydrocarbon(s) and water. Such process conditions are frequently encountered, especially during deep sea and arctic drilling, causing these molecules to nucleate, crystallize, and produce gas hydrate crystals. The formation, persistence, and accumulation of gas hydrates during drilling and transport operations to the processing facility may result in large pressure drops and/or extensive cost and downtime if they impede fluid transport.

Methods have been developed to address these problems, and can be categorized into four general areas: (1) water removal from the transport line, (2) thermal approaches to maintain and/or create a temperature profile inside the transport line so that gas hydrate formation is unfavorable, and (3) thermodynamic chemical (antifreeze compounds) addition to lower the gas hydrate crystallization temperature. However, due to problems with these methods, such as the flammability/toxicity of methanol as a thermodynamic inhibitor and the high cost of insulation and dehydration, other methods have been developed. One of the most notable advances has been the development of kinetic hydrate inhibitors, low-dose chemicals that retard, delay, and/or slow the formation of gas hydrates.

The prior art discloses gas hydrate inhibitors, for which polymeric compositions have proved beneficial. Representative compositions include those disclosed in the following U.S. Pat. Nos. 4,915,176; 5,420,370; 5,432,292; 5,639,925; 5,723,524; 6,028,233; 6,093,863; 6,096,815; 6,117,929; 6,451,891; and 6,451,892. Gas hydrate inhibitors based on vinyl amide chemistries have been especially useful. Patents disclosing vinyl amides compositions used for gas hydrate inhibition include: U.S. Pat. Nos. 5,432,292; 5,723,524; 5,874,660; 6,028,233; 6,096,815; 6,117,929; 6,180,699; 6,194,622; 6,242,518; 6,281,274; 6,451,892; and 6,544,932.

A report on kinetic inhibitors of gas hydrates is provided in "Kinetic inhibition of natural gas hydrates in offshore drilling, production, and processing," a report from the Colorado School of Mines to the U.S. Department of Energy, 1994, which is incorporated in its entirety by reference.

Several polymers containing vinyl amides and hydroxyl units are known in the prior art, but not as gas hydrate inhibitors. For example, US patent application 2005/0176849 teaches polyvinylpyrrolidone-based polymers for ink jet printing, wherein the polymer may optionally comprise monomer units with —OH functional groups, e.g., poly(vinylpyrrolidone-co-vinyl alcohol). In US patent application 2006/0074144 there is a description of water-based printing ink comprising a copolymer of an unsaturated carboxylic acid as a first monomer, and a second monomer selected from the group that includes vinyl amide-based monomers. The use of poly(vinyl pyrrolidone-co-vinyl alcohol) in photoresist compositions is disclosed in US patent application 2008/0248427. In the field of pressure-sensitive adhesives, Japanese patent JP5263055-A discloses acrylic copolymers obtained by copolymerizing monomers consisting of at least one selected from alkyl(meth)acrylates of formula $CH_2=CR_1COOR_2$ (where $R_1$ is H or methyl; and $R_2$ is C1-C12 alkyl) and 3%-10% of one or more of monomers selected from N-vinyl-2-pyrrolidone, acryloyl morpholine, N-isopropylacrylamide, N-vinyl-2-caprolactam and diacetone acrylamide.

Terpolymers of N-vinyl-2-caprolactam, dimethylaminopropyl methacrylate, and hydroxyethylmethacrylate for use in coated substrates are provided in U.S. Pat. No. 7,402,641.

Additionally, Boyko (2004) discloses hydrogels of N-vinyl-2-caprolactam-hydroxyethylmethacrylate produced by the radical crosslinking polymerization of the two monomers.

While advances in gas hydrate inhibition have been made, there yet remains a need for advanced polymer systems, especially those polymers that offer enhanced functionality, such as molecular interaction. The compositions of the current invention surprisingly provide these desired properties.

SUMMARY OF THE INVENTION

The invention relates to polymers derived at least: (A) one N-vinyl amide unit, and (B) one hydroxyl-containing acrylate unit, and to polymers derived at least from: (A) N-vinyl-2-caprolactam, and (B) one unit having: (i) at least one hydroxyl group, and/or (ii) at least one functional group convertible to a hydroxyl group wherein at least one group is converted to hydroxyl functionality in the final polymer product.

In preferred embodiments, these polymers and compositions thereof are used in oilfield applications, such as an inhibitor of gas hydrates and/or a kinetic inhibitor of gas hydrates. The polymer can assume alternating, block, and/or random configurations of the repeating units, with at least one ester group.

DETAILED DESCRIPTION OF PREFERRED EMBODIMENTS OF THE INVENTION

Disclosed herein are, three classes of related polymers, which can be generically describing as being derived from at least one N-vinyl amide unit, and a second unit having hydroxyl functionality. As described in detail later on, multiple methods exist for synthesizing the polymers. In particular, there is considerable flexibility with regard to the second unit, as the —OH group may exist prior to polymerization, or may be obtained after polymerization from groups that can be converted to hydroxyl functionality.

The polymers of this invention may be synthesized with or without solvent, wherein the reaction system may comprise any number of solvents suitable for conducting the reactions. Optionally, but not necessary, the reaction solvent may be replaced during and/or after the reactive steps, and replaced by a different solvent. When the synthesized polymers are employed in the field of use, the delivery solvent system may comprise one or more of the reaction solvents, or the reaction solvent system may be replaced entirely by a delivery solvent.

In preferred embodiments, the polymers exhibit degradability, which is expected to enhance their usefulness in marine and/or soil environments.

In highly preferred embodiment, the polymers find utility in oilfield applications where they may function as anti-agglomerants, emulsifiers, de-emulsifiers, gas hydrate inhibitors, shale swelling inhibitors, and/or scale inhibitors. In especially preferred embodiments, the polymers and compositions thereof are used as inhibitors of gas hydrates.

All percentages, ratio, and proportional used herein are based on a weight basis unless other specified.

The term gas hydrate inhibitor refers to polymers and compositions thereof that prevent or retard the formation of gas hydrates, or reduce the tendency for said hydrates to agglomerate during storage and/or hydraulic transport of hydrocarbon-based fluids comprising water.

The term halide refers to chloro, bromo, iodo and fluoro, and is preferably bromo or chloro.

The term monomer refers to the repeat units that comprise a polymer. A monomer is a compound that chemically bonds to other molecules, including other monomers, to form a polymer.

The term homopolymer refers to a molecule that comprises a single monomer, and includes such polymers wherein a small amount of polymerization solvent may be covalently bonded into the polymer.

The term polymer refers to a molecule that comprises two or more different monomers connected by covalent chemical bonds. By this definition polymer encompasses molecules wherein the number of monomer units ranges from very few, which more commonly may be called oligomers, to very many. Nonlimiting examples of polymers include copolymers, terpolymers, tetramers, and the like, wherein the polymer is a random, blocked, or alternating polymer.

The term copolymer refers to a polymer that comprises two different monomer units.

The term terpolymer refers to a polymer that comprises three different monomer units.

The term branched refers to any non-linear molecular structure. To avoid any arbitrary delineation, the term branched describes both branched and hyperbranched structures.

The term free radical addition polymerization initiator refers to a compound used in a catalytic amount to initiate a free radical addition polymerization. The choice of initiator depends mainly upon its solubility and its decomposition temperature.

The term inert solvent refers to a solvent that does not interfere chemically with the reaction.

The term soil broadly refers to materials of varying composition that typically contain various mineral constituents, weathered rock material, decomposed organic matter (humus), non-decomposed organic materials (e.g., leaves), and animal/insect material (e.g., dropping, casings). Soil means both synthetic and naturally occurring material of this description.

The term personal care composition refers to compositions intended for use on or in the human body, such as skin, sun, oil, hair, cosmetic, and preservative compositions, including those to alter the color and appearance of the skin and hair. Potential personal care compositions include, but are not limited to, compositions for increased flexibility in styling, durable styling, increased humidity resistance for hair, skin, and color cosmetics, sun care water-proof/resistance, wear-resistance, and thermal protecting/enhancing compositions.

The term performance chemicals composition refers to non-personal care compositions that serve a broad variety of applications, and include nonlimiting compositions such as: adhesives; agricultural, biocides, coatings, electronics, household-industrial-institutional (HI&I), inks, membranes, metal fluids, oilfield, paper, paints, plastics, printing, plasters, and wood-care compositions.

The subscripts m, n, and p as used herein with regard to chemical structures refer to integers commonly used in polymers to denote the number of repeating units of each monomer. In general, m, n, and p in the present invention are independently selected such that the polymer molecular weight is from about 500 atomic mass units (amu) and 5,000,000 amu.

FIRST EMBODIMENT OF THE INVENTION

By a first embodiment of the invention, polymers are provided being derived at least from: (A) one N-vinyl amide unit, and (B) one hydroxyl-containing acrylate unit selected from the group consisting of: polyethylene glycol acrylate, polyethylene glycol methacrylate, 2-hydroxyethyl acrylate, 3-hydroxypropyl methacrylate, 3-hydroxypropyl acrylate, and blends thereof.

N-Vinyl Amide-Based Unit

The polymers described by this invention are derived in part from (A) at least one N-vinyl amide-based unit. Both acyclic and cyclic constructs of these units are contemplated, which may be presented in the polymer in any type of arrangement, including, but not limited to: alternating, block, branched, linear, periodic, and/or random arrangements.

Cyclic N-vinyl amides, also known as N-vinyl lactams, may be used, either alone or in combination with acyclic N-vinyl amides. In preferred embodiments, the cyclic N-vinyl amide contain from 4 to 13 total carbon atoms.

Examples of cyclic vinyl amides include, but are not limited to: N-vinyl-2-pyrrolidone; N-vinyl piperidone; N-vinyl-2-caprolactam; N-vinyl-3-methyl pyrrolidone; N-vinyl-

4-methyl pyrrolidone; N-vinyl-S-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-3-methyl-2-caprolactam; N-vinyl-4-methyl-2-caprolactam; N-vinyl-7-methyl-2-caprolactam; N-vinyl-3,5-dimethyl-2-caprolactam; N-vinyl-3,7-dimethyl-2-caprolactam; N-vinyl-4,6-dimethyl-2-caprolactam, N-vinyl-3,5,7-trimethyl-2-caprolactam, N-vinyl-7-ethyl-2-caprolactam; N-vinyl-4-isopropyl-2-caprolactam; N-vinyl-5-isopropyl-2-caprolactam; N-vinyl-4-butyl-2-caprolactam; N-vinyl-5-butyl-2-caprolactam; N-vinyl-4-butyl-2-caprolactam; N-vinyl-5-tert-butyl-2-caprolactam; N-vinyl-2-methyl-4-isopropyl-2-caprolactam; N-vinyl-5-isopropyl-7-methyl-2-caprolactam; N-vinyl-4-octyl-2-caprolactam; N-vinyl-5-tert-octyl-2-caprolactam; N-vinyl-4-nonyl-2-caprolactam; N-vinyl-5-tert-nonyl-2-caprolactam; and blends thereof.

Due to their wide availability and known performance in gas hydrate inhibitor applications, N-vinyl-2-pyrrolidone and N-vinyl-2-caprolactam are examples of preferred N-vinyl amides of the invention.

Hydroxyl-Containing Acrylate Unit

Novel polymers of the invention include those that also comprise at least one hydroxyl-containing acrylate unit selected from the group consisting of: polyethylene glycol acrylate, polyethylene glycol methacrylate, 2-hydroxyethyl acrylate, 3-hydroxypropyl methacrylate, 3-hydroxypropyl acrylate, and blends thereof.

By way of example illustrated later, one such preferred polymer of the invention is poly(N-vinyl-2-caprolactam-co-polyethylene glycol methacrylate). It is possible to one skilled in polymerization science to produce the other polymers of the invention. By analogy to Example 1, poly(N-vinyl-2-caprolactam-co-2-hydroxyethyl acrylate) polymer can be synthesized as:

as can poly(N-vinyl-2-caprolactam-co-3-hydroxypropyl methacrylate) polymer:

SECOND EMBODIMENT OF THE INVENTION

By a second embodiment of the invention, polymers are provided being derived at least from two different units: (A) N-vinyl-2-caprolactam or its derivatives, and (B) one non-acrylate unit comprising:

(i) at least one hydroxyl group, and/or

(ii) at least one functional group convertible to a hydroxyl group wherein at least one group is converted to hydroxyl functionality in the final polymer product.

The term "N-vinyl-2-caprolactam and its derivatives" refers to the class of molecules based on N-vinyl-2-caprolactam having the structure:

wherein R is independently selected from the group consisting of hydrogen, and functionalized and unfunctionalized alkyl, cycloalkyl, alkenyl, and aryl groups, wherein any of the beforementioned groups may be with or without heteroatoms. Specific examples of N-vinyl-2-caprolactam derivatives include, but are not limited to: N-vinyl-3-methyl-2-caprolactam; N-vinyl-4-methyl-2-caprolactam; N-vinyl-7-methyl-2-caprolactam; N-vinyl-3,5-dimethyl-2-caprolactam; N-vinyl-3,7-dimethyl-2-caprolactam; N-vinyl-4,6-dimethyl-2-caprolactam, N-vinyl-3,5,7-trimethyl-2-caprolactam, N-vinyl-7-ethyl-2-caprolactam; N-vinyl-4-isopropyl-2-caprolactam; N-vinyl-5-isopropyl-2-caprolactam; N-vinyl-4-butyl-2-caprolactam; N-vinyl-5-butyl-2-caprolactam; N-vinyl-4-butyl-2-caprolactam; N-vinyl-5-cert-butyl-2-caprolactam; N-vinyl-2-methyl-4-isopropyl-2-caprolactam; N-vinyl-5-isopropyl-7-methyl-2-caprolactam; N-vinyl-4-octyl-2-caprolactam; N-vinyl-5-tert-octyl-2-caprolactam; N-vinyl-4-nonyl-2-caprolactam; and N-vinyl-5-tert-nonyl-2-caprolactam.

The non-acrylate unit, (B), is selected from the group of units that already have at least one hydroxyl group; or have at least one group that can be chemically converted to have hydroxyl functionality. The first method includes ω-hydroxy alkenes, which have the general structure:

wherein n is an integer of 1 or more. Specific examples of ω-hydroxy alkenes include allyl alcohol and 3-buten-1-ol.

Also included in this category of non-acrylates units having at least one hydroxyl group is the family of vinyl phenols, e.g., 2-vinyl phenol, 3-vinyl phenol, and 4-vinyl phenol.

Alternatively, the (B) unit can be provided by at least one convertible group has been converted to hydroxyl functionality in the final polymer product. In one embodiment of the invention, (B) is a polymerizable unit, and there are multiple reaction methods that are available to the polymer chemist to incorporate the at least one hydroxyl-containing unit into the polymer. Many examples of such polymerizable units are known, and include those based on the following chemistries: allyl, cinnamyl, fumaryl, (meth)acryl, stryenyl, and vinyl. Other families of polymerizable units can be identified by those skilled in the art. Favorable rates of reaction and product yields make this method preferred to the first. Many reactions of this category are known to one skilled in the art, and include, without limitation:

(1) hydrolysis of vinyl acetates,
(2) alcoholysis of vinyl acetates,
(3) hydrolysis of vinyl esters,
(4) alcoholysis of vinyl esters,
(5) aminolysis of vinyl esters,
(6) hydrolysis of alkenyl halides,
(7) reduction of vinyl carboxylic acids, vinyl ketones and vinyl aldehydes, and
(8) ring opening and nucleophilic addition of epoxides.

It is outside the scope of this invention to list every method by which a hydroxyl group can be provided subsequent to polymerization. Instead, the above methods are meant to represent several techniques, and emphasize the diversity of chemistries that achieve the result. A description of these chemistries and reactions can be found in a text on organic chemistry, such as *Organic Chemistry* by Morrison and Boyd (Prentice-Hall International, 1992), which is incorporated herein in its entirety by reference.

In examples of the above categories (1)-(5), the polymerizable unit comprises vinyl acetates, vinyl esters and/or alkenyl halides that are hydrolyzed, alcoholyzed, or aminolyzed to yield at least one hydroxyl group. Vinyl acetate-based units are preferred, and examples of which include, without limitation: vinyl acetate, methyl vinyl acetate, ethyl vinyl acetate, and (pent-2-en-3-yl) acetate. Examples of vinyl esters include: 2-acetoxy-2-butene, 2-acetoxy-3-methyl-2-butene, isopropenyl acetate, vinyl hexanoate, vinyl octanoate, vinyl propionate, vinyl n-valerate, and blends thereof.

Examples of alkenyl halides include, without limitation: 1-chloro-1-butene; 1-chloro-2-butene; 3-chlorocrotonic acid; 3-chloro-methacrylic acid; 1-chloro-2-pentene; 2-chloro-2-butene; 2-chloro-3-methyl-butene; 2-chloro-3-hexene; 2-chloro-2-pentene; 4-chloro-prop-3-en-2-one; 1,2-dichloroethylene; trichloroethylene; vinyl chloride; and vinylidene chloride, and their bromine and iodine analogues, and blends thereof.

All ranges of hydrolysis, alcoholysis, and aminolysis are contemplated, meaning the conversion from ester and/or halide group to hydroxyl group varies from the smallest effective level (typically about 0.1% conversion) to 100% conversion.

Preferred embodiments of the invention synthesize the at least one hydroxyl group through the polymerization of vinyl acetate followed by hydrolysis or alcoholysis. Examples of this synthesis method are provided in the Examples section.

In category (7), the hydroxyl group may be synthesized by polymerization and subsequent reduction of vinyl carboxylic acids, vinyl ketones, and vinyl aldehydes.

A carboxylic acid functional group can be reduced an alcohol through a reducing agent (e.g., lithium tetrahydridoaluminate). However, because lithium tetrahydridoaluminate may react violently with water, it may be preferred to perform the reduction anhydrously. In such cases, the desired hydroxyl group is created by final treatment with acid, e.g., dilute sulfuric acid. Examples of vinyl carboxylic acids include, but are not limited to: acrylic acid; 2-butenoic acid; cinnamic acid; 2,3-dimethylacrylic acid; 3,3-dimethylacrylic acid; 2,3-dimethyl-2-butenoic acid; 2-ethylacrylic acid; 2-ethyl-2-butenoic acid; fumaric acid; methacrylic acid, 2-pentenoic acid, 4-pentenoic acid, and blends thereof.

Likewise, a ketone functional group can be reduced to hydroxyl functionality through a Grignard reaction followed by reaction with water. Alternatively, the ketone functional group is reacted with a reducing reagent (e.g., lithium tetrahydridoaluminate) as described above for carboxylic acid conversion. Examples of vinyl ketones include, but are not limited to: ethyl vinyl ketone; 2-hepten-4-one; hex-3-ene-2-one; 4-hexen-3-one; 3-methyl-3-penten-2-one; 4-methyl-3-penten-2-one; 5-methyl-1-hexen-3-one; methyl vinyl ketone; 3-penten-2-one; propyl vinyl ketone; and blends thereof.

The reactive methods described for vinyl ketones also can be employed for converting aldehydes to hydroxyl functionality. Examples of vinyl aldehydes that can be polymerized include, but are not limited to: but-2-enal; 2-butenedial; 3-butyn-1-al; cinnamic aldehyde; 2-methyl-2-butenal; 2-methylene butyraldehyde; 2-methyl-2-pentenal; 2-methyl-2-propenal; 3-methylbut-2-enal; 2-pentenedial; prop-2-enal, and blends thereof.

By category (8), the hydroxyl group of the polymer may be derived in part through epoxide ring opening and addition by either acid- or base-catalyzed nucleophilic addition/hydrolysis/reduction. Examples of epoxides include, but are not limited to: 1,2-epoxybutane; 2,3-epoxybutane; ethylene oxide; propylene oxide; isobutylene oxide; and blends thereof.

As an alternative to incorporating at least one hydroxyl group into the polymer through a polymerizable unit, the hydroxyl group also may be integrated into the polymer via one or more solvent adducts. Without attempting to exhaust the list of potential techniques, the at least one hydroxyl group may be incorporated into the polymer via a solvent adduct during the polymerization reaction(s). It is preferred that by this method, the reaction solvent comprise a hydroxyl group. Thus, suitable reaction solvents for use by this method include, but are not limited to: alcohols (e.g., 1-butanol, 2-butanol, ethanol, ethylene glycol, methanol, 1-propanol, 2-propanol, and propylene glycol), and glycol ethers (e.g., 2-methoxyethanol, 2-butoxyethanol, 2-isopropoxyethanol). Less preferably, the solvent adduct comprises a functionality that is converted to the hydroxyl group, e.g., as described above for acetate, aldehyde, carboxylic acid, and ketone functional groups.

The number and arrangements of all of the polymerizable units in the polymer are not restricted, as they may exist in alternating, block, branched, linear, periodic, and/or random arrangements, or occupy terminal positions.

THIRD EMBODIMENT OF THE INVENTION

In addition to the two polymers described earlier, the present invention also provides a third embodiment for oilfield polymers being derived at least from: (A) one N-vinyl amide; and (B) one unit comprising:
(i) at least one hydroxyl group, and/or
(ii) at least one functional group convertible to a hydroxyl group wherein at least one group is converted to hydroxyl functionality in the final polymer product.

This definition describes, in part, the polymers of the first and second embodiments of the invention as oilfield polymers.

N-Vinyl Amide Unit

To avoid unnecessary repetition, the definition of the first unit, (A) one N-vinyl amide is the same as given in the first embodiment, and includes the same non-limiting examples and preferred first units.

Unit Comprising at Least One Hydroxyl Group, and/or at Least One Functional Group Convertible to a Hydroxyl Group The oilfield polymers of the invention also are derived, in part, from at least one unit comprising:
(i) at least one hydroxyl group, and/or
(ii) at least one functional group convertible to a hydroxyl group wherein at least one group is converted to hydroxyl functionality in the final polymer product.

For this third embodiment, the (B) unit includes the definitions described for both the first and second embodiments of the invention. That is to say, that the (B) unit can comprise at least one hydroxyl group that exists prior to the polymerization. Examples of suitable polymerizable units within this category include, but are not limited to: hydroxyl-containing acrylates (e.g., polyethylene glycol acrylate, polyethylene glycol methacrylate, 2-hydroxyethyl acrylate, hydroxyethyl methacrylate, 3-hydroxypropyl methacrylate, and 3-hydroxypropyl acrylate), and co-hydroxy alkenes (e.g., allyl alcohol and 3-buten-1-ol). All molecular weights of such units are contemplated. However, this is but one method to impart the necessary hydroxyl group into the polymer.

By a second method, the polymerizable unit comprises at least one functional group that can be converted to a hydroxyl group, e.g., by chemical reaction. Again, to avoid unnecessary repetition, these types of (B) units are described fully in the second embodiment of the invention.

Alternatively, (B) may be incorporated into the polymer via one or more solvent adducts. Without attempting to exhaust the list of potential techniques, the at least one hydroxyl group may be incorporated into the polymer via a solvent adduct during the polymerization reaction(s). It is preferred that by this method, the reaction solvent comprise a hydroxyl group. Thus, suitable reaction solvents for use by this method include, but are not limited to: alcohols (e.g., 1-butanol, 2-butanol, ethanol, ethylene glycol, methanol, 1-propanol, 2-propanol, and propylene glycol), and glycol ethers (e.g., 2-methoxyethanol, 2-butoxyethanol, 2-isopropoxyethanol). Less preferably, the solvent adduct comprises a functionality that is converted to the hydroxyl group, e.g., as described above for acetate, aldehyde, carboxylic acid, and ketone functional groups.

The number and arrangements of all of the polymerizable units in the polymer are not restricted, as they may exist in alternating, block, branched, linear, periodic, and/or random arrangements, or occupy terminal positions.

Broadly speaking, the nature of the unit comprising the hydroxyl group may contribute to the degradability of the invented compositions. One example of a degradable hydroxyl-containing unit is a vinyl alcohol-based unit, sc., produced by the hydrolysis or alcoholysis of vinyl ester-based units. It is be noted, however, that degradability is not a requirement of the hydroxyl-containing unit.

Reaction Solvent

The reactions of this invention can be performed with and without in a reaction solvent. If a solvent is desired, both water-soluble and water-insoluble reaction solvents may be used, and may be selected based on a number of considerations, such as, but not limited to the final product application. It is even possible to produce the polymer in multiple steps, wherein one type of solvent is used in one step, that solvent removed, and then replace with a different type of solvent.

The system used to deliver the polymer composition may comprise a reaction solvent, a blend of reaction solvents, or the reaction solvent(s) may be removed and a different solvent system used for further reaction and/or delivery.

Examples of reaction solvents include, but are not limited to:
(A) water,
(B) straight-chain, branched, or cyclic alcohols (e.g., n-butanol, tert-butanol, ethanol, methanol, 1-propanol, 2-propanol),
(B) straight-chain, branched, or cyclic difunctional, bifunctional or polyfunctional alcohols (e.g., ethylene glycol, monoethylene glycol, glycerol propylene, glycol),
(C) homologues of ethylene oxide and propylene oxide units (e.g., diethylene glycol, triethylene glycol),
(D) glycol ethers (e.g., 2-butoxyethanol, 2-ethoxyethanol, 2-isopropoxyethanol, 2-methoxyethanol, and 2-propoxyethanol)
(E) straight-chain, branched, or cyclic alkanes (e.g., cyclohexane, isooctane, n-hexane, n-heptane),
(F) alkylbenzenes (e.g., benzene, ethylbenzene, toluene, xylene),
(G) monofunctional and difunctional (alkyl)benzenes (e.g., cresol, phenol, resorcinol),
(H) straight-chain, branched or cyclic aliphatic and aromatic ketones (e.g., acetone, acetophenone, cyclohexanone, methyl ethyl ketone,),
(I) water-soluble organic solvents (e.g., alcohols, dimethylformamide, dimethylacetamide, N-methylpyrrolidone, N-ethylpyrrolidone, dimethyl sulfoxide, furan, tetrahydrofuran),
(J) water-insoluble organic solvent (e.g., alkylbenzenes, straight-chain hydrocarbons, chlorinated hydrocarbons),
(K) natural or synthetic waxes, oils, fats, and emulsifiers which are liquid under the polymerization conditions, both per se and in a mixture with the abovementioned organic solvents or with water.

The described polymers find use in oilfield applications, for example, as an inhibitor of gas hydrates. Thus, the composition may present the polymer in a water-dispersible and/or water-soluble solvents. Without being bound to specific theory, it is believed that water-dispersible and/or water-soluble solvents help to improve the effectiveness of the polymer by promoting a greater extension of polymer molecule in solution. In addition, such solvents may help to improve the solubility of the polymer in aqueous solution, and improve the compatibility of the composition at high injection temperature.

Examples of preferred water-dispersible and/or water-soluble reaction solvents include, but are not limited to: alcohols, lactams (N-methyl pyrrolidone), glycol ethers (e.g., 2-propoxyethanol), furans (e.g., furan, tetrahydrofuran), and blends thereof.

Highly preferred reactions and/or delivery solvents are ethanol and 2-propanol when the polymer is employed for gas hydrate inhibition.

An exemplary glycol ether is 2-butoxyethanol, which is highly preferred as a reaction solvent and/or delivery solvent.

In non-water based oilfield applications, there may be a preference for water insoluble reaction solvent(s) and/or delivery solvent(s). Solvents that are water insoluble include, but are not limited to: pure hydrocarbons, meaning those compounds consisting entirely of only carbon and hydrogen (e.g., benzene, cyclohexane, heptane, hexane, octane, toluene, and xylene), and impure hydrocarbons, meaning those compounds consisting of carbon, hydrogen, and other bonded atoms (e.g., chloroform, and dichloromethane).

In one embodiment of the invention, the reaction solvent also is employed for delivery. Less preferably, the polymer is produced in one solvent, that solvent removed, and then a preferred solvent or blends of preferred solvents added.

It is recognized that during the polymerization step (described below), an amount of the reaction solvent may be bonded covalently into the product, viz., incorporated into the polymer as a solvent adduct. Such a solvent adduct is possible with the described water-soluble reaction solvents. The existence of such an adduct can be provided by $^{13}$C NMR studies.

Again not to be bounded by theory, it is also believed that the solvent adduct may impart surfactant-like properties to cause an extended polymer conformation in solution, which presumably exposes more of the polymer molecule to interact with the hydrate crystal lattice.

Polymerization

Methods to produce the polymers are known to one, skilled in the art, and include free radical polymerization, emulsion polymerization, ionic chain polymerization, and precipitation polymerization, the methods of which are known to one skilled in the art. Free radical polymerization is a preferred polymerization method, especially when using water-dispersible and/or water-soluble reaction solvent(s), and is described in "Decomposition Rate of Organic Free Radical Polymerization" by K. W. Dixon (section II in *Polymer Handbook*, volume 1, 4$^{th}$ edition, Wiley-Interscience, 1999), which is incorporated by reference.

Compounds capable of initiating the free-radical polymerization include those materials known to function in the prescribed manner, and include the peroxo and azo classes of materials. Exemplary peroxo and azo compounds include, but are not limited to: acetyl peroxide; azo bis-(2-amidinopropane) dihydrochloride; azo bis-isobutyronitrile; 2,2'-azo bis-(2-methylbutyronitrile); benzoyl peroxide; di-tert-amyl peroxide; di-tert-butyl diperphthalate; butyl peroctoate; tert-butyl dicumyl peroxide; tert-butyl hydroperoxide; tert-butyl perbenzoate; tert-butyl permaleate; tert-butyl perisobutyl-rate; tert-butyl peracetate; tert-butyl perpivalate; para-chlorobenzoyl peroxide; cumene hydroperoxide; diacetyl peroxide; dibenzoyl peroxide; dicumyl peroxide; didecanoyl peroxide; dilauroyl peroxide; diisopropyl peroxodicarbamate; dioctanoyl peroxide; lauroyl peroxide; octanoyl peroxide; succinyl peroxide; and bis-(ortho-toluoyl) peroxide.

Also suitable to initiate the free-radical polymerization are initiator mixtures or redox initiator systems, including: ascorbic acid/iron (II) sulfate/sodium peroxodisulfate, tert-butyl hydroperoxide/sodium disulfite, and tert-butyl hydroperoxide/sodium hydroxymethanesulfinate.

The polymer can be synthesized using a one-step technique. A one-step method may facilitate production, as the reactants (including initiator) can be charged into the reaction vessel in one campaign. To maintain the elegance of this one-step technique, it is preferred to polymerize at least one unit that already comprises a hydroxyl group, and thereby avoid a separate conversion reaction step. By non-limiting example of this method, N-vinyl amide and hydroxyethyl methacrylate can be charged into a reactor with 2-butoxyethanol and tert-amyl peroxy-2-ethylhexanoate to synthesize poly(N-vinyl amide-co-hydroxyethyl methacrylate).

Alternatively, the described polymer is produced in two steps. The first step is a polymerization comprising at least one N-vinyl amide-based unit, and at least one polymerizable unit comprising at least one group convertible to a hydroxyl group. The second step is the conversion of some or all of the convertible functional groups to hydroxyl functionality. Example 3 illustrates a two-step method.

Composition and Use Levels

Polymers produced by this invention comprise, by weight:

from about 1% to about 99% of N-vinyl-2-caprolactam (Embodiment 1), or an N-vinyl amide unit (Embodiments 2 and 3), and from about 1% to about 99% of a hydroxyl-containing acrylate unit. (Embodiment 1), or a non-acrylate unit comprising a hydroxyl group, and/or a unit comprising a functional group convertible to hydroxyl functionality (Embodiment 2); or a unit comprising a hydroxyl group, and/or a unit comprising a functional group convertible to hydroxyl functionality (Embodiment 3).

More preferably, the polymers comprise:

from about 50% to about 99% of N-vinyl-2-caprolactam (Embodiment 1), or an N-vinyl amide unit (Embodiments 2 and 3), and from about 1% to about 50% of a hydroxyl-containing acrylate unit (Embodiment 1), or a non-acrylate unit comprising a hydroxyl group, and/or a unit comprising a functional group convertible to hydroxyl functionality (Embodiment 2), or a unit comprising a hydroxyl group, and/or a unit comprising a functional group convertible to hydroxyl functionality (Embodiment 3).

In especially preferred embodiments, the polymers produced by this invention comprise:

from about 60% to about 99% of N-vinyl-2-caprolactam (Embodiment 1), or an N-vinyl amide unit (Embodiments 2 and 3), and from about 1% to about 40% of a hydroxyl-containing acrylate unit (Embodiment 1), or a non-acrylate unit comprising a hydroxyl group, and/or a unit comprising a functional group convertible to hydroxyl functionality (Embodiment 2), or a unit comprising a hydroxyl group, and/or a unit comprising a functional group convertible to hydroxyl functionality (Embodiment 3).

The aforementioned polymer compositions have a molecular weight of about 500 amu to about 5,000,000 atomic mass units (amu), as determined by gel permeation chromatography using polyethylene glycol standards. More preferably, the polymer molecular weight is from about 500 amu to about 100,000 amu.

When the polymers are employed as gas hydrate inhibitors, then any convenient concentration of inhibitor in the delivery solvent can be used, so long as it is effective in its purpose. Generally, the polymeric gas hydrate inhibitor is used in an amount of about 0.1% to about 3% by weight of the water present. The compositions also may include (without limitation) one or more biocides, corrosion inhibitors, emulsifiers, de-emulsifiers, water-soluble salts having a multivalent cation, defoamers, lubricants, rheology modifiers, and/or shale swelling inhibitor. These adjuvants and their addition levels are known to one skilled in the art of Oilfield applications, especially gas hydrate formulations.

The water-soluble metal salt comprising multivalent cations is suitably a water-soluble salt of a metal from Group II or Group VI of the Period Table. More specifically, these are suitably salts of one or more metals selected from copper, calcium, magnesium, zinc, aluminium, iron, titanium, zirconium and chromium. Since the salts must be water-soluble, they are preferably the halides, nitrates, formates and acetates of these metals. In choosing the relevant metal, care must be taken to ensure that the conditions in the rock formation matrix are not such as to cause scaling by one of these metals. Calcium chloride, magnesium chloride or mixtures thereof is preferred. The solution of the water soluble salt is suitably an aqueous solution.

It is contemplated that higher concentrations may be preferred in some applications. For example, at low application temperature high polymer concentrations may be needed to effectively inhibit gas hydrate formation and/or conduit blockage. Other applications may benefit from a reduced volume of concentrate solution, as it may simplify product handling and/or ease introduction into the petroleum fluid. Nonetheless, it is understood that the actual concentration will vary, depending upon many parameters like the specific application, selection of carrier solvent, the chemical composition of the inhibitor, the system temperature, and the inhibitor's solubility in the carrier solvent at application conditions. A suitable concentration for a particular application, however, can be determined by those skilled in the art by taking into account the inhibitor's performance under such application, the degree of inhibition required for the petroleum fluid, and the inhibitor's cost.

Degradability

Quite unexpectedly, the discovery was made that polymers of the invention also may exhibit degradability, meaning that the molecule is broken down into one or more parts by biological, chemical, and/or other mechanisms. However, without being bound by theory, it is believed that the biological and/or chemical factors of the seawater test also may be present, or different factors may exist to provide polymer degradability in other environments, such as soil.

It is possible to engineer degradability into the polymers of the present invention with proper selection and ratios of the two prescribed units of Embodiments 1, 2, and 3. Broadly speaking, the nature of the unit comprising the hydroxyl group may contribute to the degradability of the invented compositions. One example of a degradable hydroxyl-containing unit is a vinyl alcohol-based unit, sc., produced by the hydrolysis or alcoholysis of vinyl ester-based units. Due to the complexity of all contributing factors; it is not possible to prescribe polymer composition-degradability results. For example, two examples of the invention are provided wherein greater degradability was attained from the polymer having lower vinyl alcohol content (30% vs. 50%).

It is noted, however, that degradability is not a requirement for the polymers of the invention.

Such polymers and compositions thereof may serve a variety of personal care and performance chemicals compositions, especially where degradability is a desired feature. These fields include, without limitation: adhesive, agriculture, cleaning, coating, dental, encapsulation, imaging, household/industrial/institutional, medical, membrane, oilfield, oral care, packaging, personal care, performance chemicals, pharmaceutical, printing, and veterinary applications.

In highly preferred embodiments, the polymers find application as gas hydrate inhibitors for oilfield treatment.

Product Characterization

The final product can be analyzed by known techniques to characterize the product. Especially preferred are the techniques of $^{13}$C nuclear magnetic resonance (NMR) spectroscopy, gas chromatography (GC), and gel permeation chromatography (GPC) in order to decipher polymer identity, residual monomer concentrations, polymer molecular weight, and polymer molecular weight distribution.

Nuclear magnetic resonance (NMR) spectroscopy is an especially preferred method to probe the polymerization product in terms of chemical properties such as monomeric composition, sequencing and tacticity. Analytical equipment, suitable for these analyses include the Inova 400-MR NMR. System by Varian Inc. (Palo Alto, Calif.). References broadly describing NMR include: Yoder, C. H. and Schaeffer Jr., C. D., *Introduction to Multinuclear NMR*, The Benjamin/Cummings Publishing Company, Inc., 1987; and Silverstein, R. M., et al., *Spectrometric Identification of Organic Compounds*, John Wiley & Sons, 1981, which are incorporated in their entirety by reference.

Residual monomer levels can be measured by GC, which can be used to indicate the extent of reactant conversion by the polymerization process. GC analytical equipment to perform these tests are commercially available, and include the following units: Series 5880, 5890, and 6890 GC-FID and GC-TCD by Agilent Technologies, Inc. (Santa Clara, Calif.). GC principles are described in *Modern Practice of Gas Chromatography*, third edition (John Wiley & Sons, 1995) by Robert L. Grob and Eugene F. Barry, which is hereby incorporated in its entirety by reference.

GPC is an analytical method that separates molecules based on their hydrodynamic volume (or size) in solution of the mobile phase, such as hydroalcoholic solutions with surfactants. GPC is a preferred method for measuring polymer molecular weight distributions. This technique can be performed on known analytical equipment sold for this purpose, and include the TDAmax™ Elevated Temperature GPC System and the RImax™ Conventional Calibration System by Viscotek™ Corp. (Houston, Tex.). In addition, GPC employs analytical standards as a reference, of which a plurality of narrow-distribution polyethylene glycol and polyethylene oxide standards representing a wide range in molecular weight is the preferred. These analytical standards are available for purchase from Rohm & Haas Company (Philadelphia, Pa.) and Varian Inc. (Palo Alto, Calif.). GPC is described in the following texts, which are hereby incorporated in their entirety by reference: Schroder, E., et al., *Polymer Characterization*, Hanser Publishers, 1989; Billingham, N.C., *Molar Mass Measurements in Polymer Science*, Halsted Press, 1979; and Billmeyer, F., *Textbook of Polymer Science*, Wiley Interscience, 1984.

The following, non-limiting examples are intended to illustrate the embodiments of the invention:

EXAMPLES

Example 1

Synthesis of Poly (95% VCAP-co-5% HEMA) in BGE with Initiator

Preparation of feed solution #1: N-vinyl-2-caprolactam (VCAP) (9.5 g) and hydroxyethyl methacrylate (HEMA) (0.5 g) were codissolved in 2-butoxyethanol (BGE) (40 g).

Preparation of feed solution #2: N-vinyl-2-caprolactam (85.5 g) and hydroxyethyl methacrylate (4.5 g) were codissolved in 2-butoxyethanol (60 g).

Feed solution #1 was charged into the reaction kettle and heated to 116° C. under nitrogen purge. After reaching temperature, a tert-amyl peroxy-2-ethylhexanoate initiator, Trigonox® 121 (0.375 g), was added, and the mixture was stirred for 15 minutes.

Over a period of 3 hours, feed solution #2 was pumped into the reaction kettle containing feed solution #1, and, simultaneously, 13 charges of Trigonox® 121 (each 0.375 g) were added to the reactor every 15 minutes.

After the last charge of Trigonox® 121 the reaction kettle was cooled to 105° C., at which point additional Trigonox® 121 (0.375 g) was added into the reaction kettle. Thirty minutes later, a final charge of Trigonox® 121 (0.375 g) was added to the reaction kettle and the temperature was held for 1 hour.

Thereafter, the reaction kettle was allowed to cool to room temperature, and a brown, viscous polymer was discharged from the reaction kettle. The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 2

Synthesis of Poly (95% VCAP-co-5% PEGMA) in BGE without Initiator

The method of Example 1 was employed with the following changes:

In feed solution #1, N-vinyl-2-caprolactam (9.5 g) and polyethylene glycol methacrylate (PEGMA) (0.5 g) [with a weight-average molecular weight ($M_w$) of 526 amu] were codissolved in 2-butoxyethanol (40 g).

In feed solution #2, N-vinyl-2-caprolactam (85.5 g) and polyethylene glycol methacrylate (PEGMA) (4.5 g), [with a $M_w$ of 526 amu], were codissolved in 2-butoxyethanol (60 g).

Upon cooling, a brown, viscous polymer was discharged from the reaction kettle. The molecular weight of the polymer was measured by GPC and found to be within the range of 2000 amu-4000 amu.

The polymer product can assume alternating, block, and/or random configurations of the repeating units. The chemical structure subscripts m, n and p may be any integer equal to or greater than 1.

Example 3

Synthesis of Poly (82% VCAP-co-18% VOH) in MeOH/H$_2$O with Initiator

Synthesis of Poly (70% VCAP-co-30% VAc)

Preparation of feed solution #1: N-vinyl-2-caprolactam (140 g), N-vinyl acetate (VAc) (60 g), and methanol (MeOH) (50 g) were mixed in, a beaker.

Preparation of feed solution #2: Trigonox® 121 (12 g) was dissolved in methanol (50 g).

A 1-L stainless steel reactor was fitted with propeller agitator, reflux condenser, nitrogen inlet tube and thermocouple reactor. Methanol (300 g) was added, and then, under nitrogen purge, was heated to 116° C.

Then, all of the feed solution #1 and a portion of feed solution #2 (52 g) were fed over 180 minutes. After 15 minutes, the remainder of feed solution #2 was charged over 30 minutes.

After another one hour reaction, the reactor was cooled down to room temperature. The product obtained from the polymerization reaction was a brown, viscous copolymer of poly (VCAP-co-VAc) (70/30 mass ratio) in methanol at 33% solids.

The poly (VCAP-co-VAc) copolymer had a $M_w$ of 4,000, as determined by gel permeation chromatography (polyethylene glycol standard).

The polymer product can assume alternating, block, and/or random configurations of the repeating units. The chemical structure subscripts m and n may be any integer equal to or greater than 1.

Hydrolysis to Produce Poly (82% VCAP-co-18% VOH)

In a three neck flask equipped with a condenser and a thermowatch, the poly (VCAP-co-VAc) product (i.e., polymer in reaction solvent) of this example (100 g) was mixed with a 20% sodium hydroxide (NaOH) solution (24.5 g).

The reactor was heated under nitrogen purge to 50° C.

After 4 hours of reaction, the reactor was cooled down to room temperature. The product discharged from the vessel and vacuum filtrated. The filtrate obtained was a brown, viscous copolymer of poly[VCAP-co-vinyl alcohol (VOH)] (82/18 mass ratio) in a mixture of methanol and water (reaction product) (MeOH/H$_2$O=3:1), which was confirmed by FT-IR spectroscopy. The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 4

Synthesis of Poly (82% VCAP-co-18% VOH) in MeOH/H$_2$O with Initiator

The polymerization procedure of Example 3 was followed.

Hydrolysis to Produce Poly (82% VCAP-co-18% VOH)

In a three neck flask equipped with a condenser and a thermowatch, charge NaOH (>97% pure) pellet (5.0 g) into the poly (VCAP-co-VAc) product (i.e., polymer in reaction solvent) of this example (100 g).

The reactor was heated under nitrogen purge to 50° C.

After 4 hours of reaction, the reactor was cooled down to room temperature. The product discharged from the vessel and vacuum filtrated. The filtrate obtained was a brown, viscous copolymer of poly[VCAP-co-vinyl alcohol (VOH)] (82/18 mass ratio) in a mixture of methanol and water (reaction product) (MeOH/H$_2$O=3:1), which was confirmed by FT-IR spectroscopy. The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 5

Synthesis of Poly (82% VCAP-co-18% VOH) in MeOH/H$_2$O

Synthesis of Poly (70% VCAP-co-30% VAc)

Preparation of feed solution #1: N-vinyl-2-caprolactam (168 g), and N-vinyl acetate (72 g) were dissolved in methanol (50 g).

Preparation of feed solution #2: Luperox® 11 M75 (21.6 g), a tert-butyl peroxypivalate initiator, was dissolved in methanol (50 g).

A 1-L stainless steel reactor was fitted with propeller agitator, reflux condenser, nitrogen inlet tube and thermocouple reactor. Methanol (250 g) was added, and then, under nitrogen purge, was heated to 80° C.

Then, all of feed solution #1 was feed into the reactor over 180 minutes while feeding solution #2 was feed into the reactor over 210 minutes.

The reaction was held for 2 hours and then the reactor was cooled down to room temperature. The product obtained from the polymerization reaction was a brown, viscous copolymer of poly (VCAP-co-VAc) (70/30 mass ratio) in methanol at 40% solids.

The poly (VCAP-co-VAc) copolymer had a $M_w$ of about 2,000 amu (polyethylene glycol standard).

The polymer product can assume alternating, block, and/or random configurations of the repeating units. The chemical structure subscripts m and n may be any integer equal to or greater than 1.

Hydrolysis to Produce Poly (82% VCAP-co-18% VOH)

In a three neck flask equipped with a condenser and a thermowatch, the poly (VCAP-co-VAc) product (i.e., polymer in reaction solvent) of this example (200 g) was mixed with a 20% NaOH solution (50 g).

The reactor was heated under nitrogen purge to 50° C.

After 4 hours of reaction, the reactor was cooled down to room temperature. After vacuum filtration, the product obtained was a brown, viscous copolymer of poly (VCAP-co-VOH) (82/18 mass ratio) in a mixture of methanol and water (reaction product) (MeOH/$H_2O$=2:1 mass ratio). The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 6

Synthesis of Poly (82% VCAP-co-18% VOH) in BGE/$H_2O$

Synthesis of Poly (70% VCAP-co-30% VAc)

Preparation of feed solution 1: N-vinyl-2-caprolactam (350 g), and N-vinyl acetate (150 g) were dissolved in BGE (450 g).

Preparation of feed solution #2: Luperox® 11 M75 (50.0 g), a tert-butyl peroxypivalate initiator, was dissolved in BGE (50 g).

A 1-L stainless steel reactor was fitted with propeller agitator, reflux condenser, nitrogen inlet tube and thermocouple reactor. BGE (150 g) was added, and then, under nitrogen purge, was heated to 80° C.

Then, all of the feed solution #1 and a portion of feed solution #2 (72 g) were fed over 180 minutes. After 30 minutes, the remainder of feed solution #2 was charged over 30 minutes.

The reaction was held for 1.5 hours. Then, the reactor was cooled down to room temperature. The product obtained from the polymerization reaction was a brown, viscous copolymer of poly (VCAP-co-VAc) (70/30 mass ratio) in BGE at 43.5% solids.

The poly (VCAP-co-VAc) copolymer had a $M_w$ of about 2,100 amu.

The polymer product can assume alternating, block, and/or random configurations of the repeating units. The chemical structure subscripts m and n may be any integer equal to or greater than 1.

Hydrolysis to Produce Poly (82% VCAP-co-18% VOH)

In a three neck flask equipped with a condenser and a thermowatch, the poly (VCAP/VAc) product of this example (250 g) was mixed with a 30% NaOH solution (50 g).

The reactor was heated under nitrogen purge to 50° C. and held for 4 hours. Thereafter, the reactor was cooled down to room temperature and vacuum filtrated to remove the solids.

This obtained product was a brown, viscous copolymer of poly (VCA-co-VOH) (82/18 mass ratio) at 40% solids in a mixture of BGE and water (reaction product) (BGE/$H_2O$=2.8/1.0 mass ratio). The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 7

Synthesis of Poly (82% VCAP-co-18% VOH) in BGE/$H_2O$

The polymerization procedure of Example 6 was followed.

Hydrolysis to Produce Poly (82% VCAP-co-18% VOH)

In a three neck flask equipped with a condenser and a thermowatch, the poly (VCAP/VAc) product of this example (450 g) was mixed with a 22% NaOH solution (147 g). The reactor was heated under nitrogen purge to 50° C. and held for 5 hours. Thereafter, the reactor was cooled down to room temperature to discharge the products. Centrifuge the product and decant to remove the solids.

This obtained product was a brown, viscous copolymer of poly (VCA-co-/VOH) (82/18 mass ratio) at 40% solids in a mixture of BGE and water (reaction product) (BGE/$H_2O$=2.8/1.0 mass ratio). The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 8

Synthesis of Poly (82% VCAP-co-18% VOH) in BGE/$H_2O$

Synthesis of Poly (70% VCAP-co-30% VAc)

Preparation of feed solution #1: N-vinyl-2-caprolactam (210 g) and N-vinyl acetate (90 g) were codissolved in BGE.

Preparation of feed solution #2: Luperox® 11 M75 (30.0 g), a tert-butyl peroxypivalate initiator, was dissolved in BGE (60 g).

A 1-L stainless steel reactor was fitted with propeller agitator, reflux condenser, nitrogen inlet tube and thermocouple reactor. BGE (240 g) was added, and then, under nitrogen purge, was heated to 80° C.

Then, all of the feed solution #1 and a portion of feed solution #2 (72 g) were fed over 210 minutes. After 30 minutes, the remainder of feed solution #2 was fed into the reactor over 30 minutes.

The reaction, was held for 1 hour. Then, the reactor was cooled down to room temperature. The product obtained from the polymerization reaction was a brown, viscous copolymer of poly (VCAP-co-VAc) (70/30 mass ratio) in BGE at 48.3% solids.

The poly (VCAP-co-VAc) copolymer had a $M_w$ of about 2200 amu.

The polymer product can assume alternating, block, and/or random configurations of the repeating units. The chemical structure subscripts m and n may be any integer equal to or greater than 1.

Hydrolysis to Produce Poly (82% VCAP-co-18% VOH)

In a three neck flask equipped with a condenser and a thermowatch, the poly (VCAP-co-VAc) product of this example (250 g) was mixed with a 21.5% NaOH solution (83.5 g).

The reactor was'heated under nitrogen purge to 50° C. and held for 4 hours. Thereafter, the reactor was cooled down to room temperature.

Then, 200 g of deionized water was added to the reactor and stirred for 30 minutes. The product was transferred from the reactor to a separating funnel and allowed to settle until the mixture was separated into two layers. The bottom layer was removed, and the remaining top layer was distilled at 50° C. and 25 mm Hg. The product obtained after distillation was 40% solids.

The obtained product was a brown, viscous copolymer of poly (VCA-co-VOH) (82/18 mass ratio) in a mixture of BGE and water (reaction product). The molecular weight of the polymer was measured by GPC and found to be within the range of 2000 amu-4000 amu.

The polymer product can assume alternating, block, and/or random configurations of the repeating units. The chemical structure subscripts in and n may be any integer equal to or greater than 1.

Example 9

Synthesis of poly (82% VCAP-co-18% VOH) in BGE/MeOH

The polymerization procedure of Example 8 was followed.

Alcoholysis to Produce poly (82% VCAP-co-18% VOH)

In a three neck flask equipped with a condenser and a thermowatch, the poly (VCAP-co-VAc) product of this example (100 g) was mixed with 25% of sodium methoxide in methanol (2 g), and methanol (50 g). The reaction mixture was heated to 65° C. and then refluxed for 16 hours. Thereafter the reaction was cooled to room temperature.

The final product was a clear, brown, viscous copolymer of poly (VCAP-co-VOH) (82/18 mass ratio) in BGE and methanol (BGE/methanol=1/1.16 mass ratio). The molecular weight of the polymer was measured by GPC and found to be within the range of 2000 amu-4000 amu.

The polymer product can assume alternating, block, and/or random configurations of the repeating units. The chemical structure subscripts in and n may be any integer equal to or greater than 1.

Example 10

Synthesis of Poly (82% VCAP-co-18% VOH) in BGE

The polymerization procedure of Example 8 was followed.

Alcoholysis to Produce Poly (82% VCAP-co-18% VOH)

In a three neck flask equipped with a condenser and a thermowatch, the poly (VCAP/VAc) product of this example (100 g) was mixed with 25% of Sodium Methoxide in Methanol (2 g), Na2CO3 ((2.0 g) and Methanol (50 g). The reaction mixture was heated to 65° C. and refluxed for 8 hours. Thereafter the reaction was cooled down to room temperature. Then product was discharged; and filtrated to remove the solids.

The final product was a clear, brown, viscous copolymer of poly (VCAP-co-VOH) (82/18 mass ratio) in BOB and methanol (BGE/methanol=1/1.16 mass ratio). The molecular weight of the polymer was measured by GPC and found to be within the range of 2000 amu-4000 amu.

The polymer product can assume alternating, block, and/or random configurations of the repeating units. The chemical structure subscripts in and n may be any integer equal to or greater than 1.

Example 11

Synthesis of Poly (82% VCAP-co-18% VOH) in IPA/H$_2$O

Synthesis of Poly (70% VCAP-co-30% VAc) in IPA

The polymerization procedure of Example 6 was followed except the solvent was IPA.

The polymerization product was produced at 50% solids.

Hydrolysis to Produce Poly (82% VCAP-co-18% VOH)

The hydrolysis procedure of Example 6 was followed with the poly (VCAP-co-VAc) product of this example.

The final product obtained was a clear, brown and viscous copolymer of poly (VCAP-co-VOH) (82/18 weight ratio) in IPA and water. The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 12

Synthesis of Poly (74% VCAP-co-26% VOH) in BGE/H₂O

Synthesis of Poly (60% VCAP-co-40% VAc) in BGE with Initiator

The polymerization procedure of Example 6 was followed except N-vinyl-2-caprolactam and N-vinyl acetate (60/40 mass ratio) were co dissolved in BGE.

The polymerization product was produced at 50±2% solids.

The polymer product can assume alternating, block, and/or random configurations of the repeating units. The chemical structure subscripts in and n may be any integer equal to or greater than 1.

Hydrolysis to Produce Poly (74% VCAP-co-26% VOH)

The hydrolysis procedure of Example 6 was followed with the poly (VCAP-co-VAc) product of this example, except that a 33.33% NaOH solution (54 g) was used.

The final product was a clear, brown, viscous copolymer of poly (VCAP-co-VOH) (74/26 mass ratio) in BGE and water. The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Synthesis of Poly (50% VCAP-co-50% VAc) in BGE with Initiator

The polymerization procedure of Example 6 was followed except N-vinyl-2-caprolactam and N-vinyl acetate (50/50 mass ratio) were co dissolved in the same reaction solvent.

The polymerization product was produced at 50±2% solids.

The polymer product can assume alternating, block, and/or random configurations of the repeating units. The chemical structure subscripts m and n may be any integer equal to or greater than 1.

Hydrolysis to Produce Poly (66% VCAP-co-34% VOH)

The hydrolysis procedure of Example 7 was followed with the poly (VCAP-co-VAc) product of this example, except that a 33.3% NaOH solution was used.

The final product was a clear, brown, viscous copolymer of poly (VCAP-co-VOH) (66/34 mass ratio) in a mixture of BGE and water (reaction product). The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 13

Synthesis of Poly (66% VCAP-co-34% VOH) BGE/

Example 14

Synthesis of Poly (56% VCAP-co-44% VOH) in BGE/H₂O

Synthesis of Poly (40% VCAP-co-60% VAc) in BGE

The polymerization procedure of Example 6 was followed except N-vinyl-2-caprolactam and N-vinyl acetate (40/60 mass ratio) were dissolved in BGE.

The polymerization product was produced at 50±2% solids.

The polymer product can assume alternating, block, and/or random configurations of the repeating units. The chemical structure subscripts in and n may be any integer equal to or greater than 1.

Hydrolysis to Produce Poly (56% VCAP-co-44% VOH)

The hydrolysis procedure of Example 7 was followed with the poly (VCAP-co-VAc) product of this example.

The final product was a clear, brown, viscous copolymer of poly (VCAP-co-VOH) (56/44 mass ratio) in a mixture of BGE and water (reaction product). The molecular weight of the polymer was measured by GPC and found to be within the range of 2000 amu-4000 amu.

The polymer product can assume alternating, block, and/or random configurations of the repeating units. The chemical structure subscripts m and n may be any integer equal to or greater than 1.

Example 15

Biodegradability Testing of Poly (82% VCAP-co-18% VOH) in BGE/H$_2$O

The hydrolyzed polymer synthesized in Example 7 was tested for biodegradability in seawater using the OECD Guideline 306, "Biodegradability in Seawater, Closed Bottle Method," which is hereby incorporated in its entirety by reference. The employed GLP method measured the biodegradability of a sample in unpolluted, nutrient-enriched seawater. Biodegradability was calculated as the ratio of the measured biochemical oxygen demand (BOD) to the theoretical oxygen demand (ThOD). The polymer of Example 7 was added to the test system at a concentration corresponding to 4.50 ThOD/L in the test substance solution. The reference substance (sodium benzoate) was added to the test system at a concentration corresponding to 4.01 mg ThOD/L in the reference substance solution.

Figure 1:
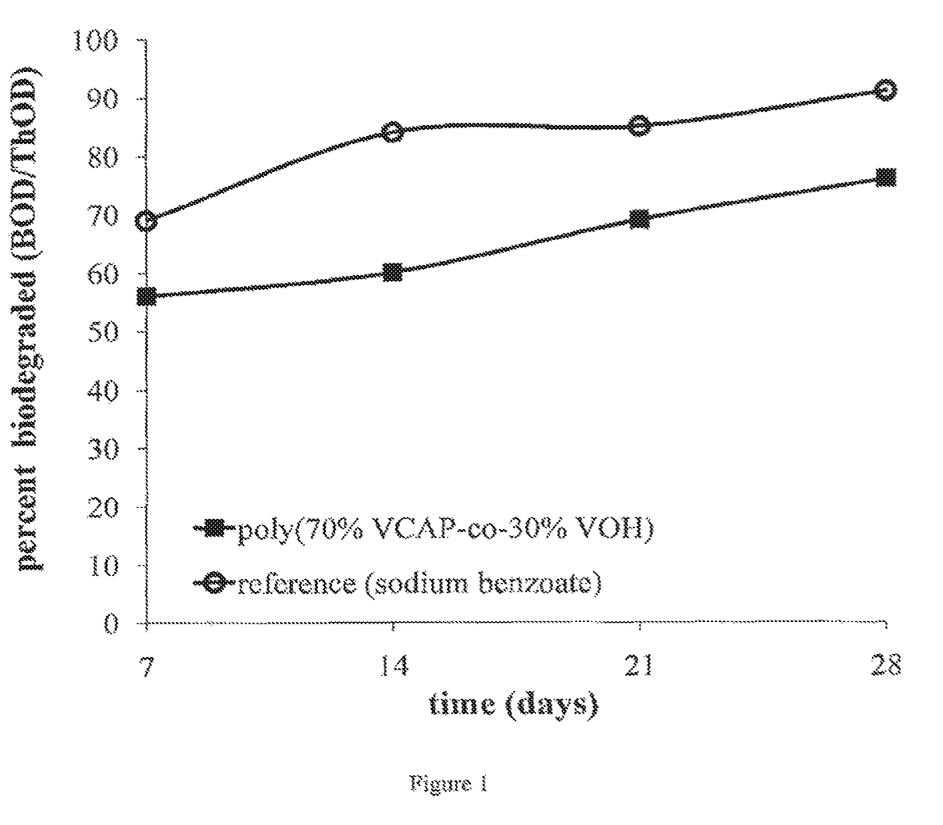
FIG. 1 is a graph of percent biodegradation for poly (70% VCAP-co-30% VOH) measured in accordance with Example 15.

Biodegradation was calculated based on measured values after 7, 14, 21, and 28 days (FIG. 1). The biodegradation of poly (70% VCAP-co-30% VOH) after 28 days was calculated to be 76%. OECD Guideline 306 provides an indication of biodegradation in seawater when the calculated biodegradation exceeds 60%, and poly (70% VCAP-co-30% VOH) is believed to be degradable in a marine environment.

Example 16

Biodegradability Testing of Poly (66% VCAP-co-34% VOH) in BGE/H$_2$O

The hydrolyzed polymer synthesized in Example 13 was tested for biodegradability in seawater using the same method described in Example 15.

Figure 2:
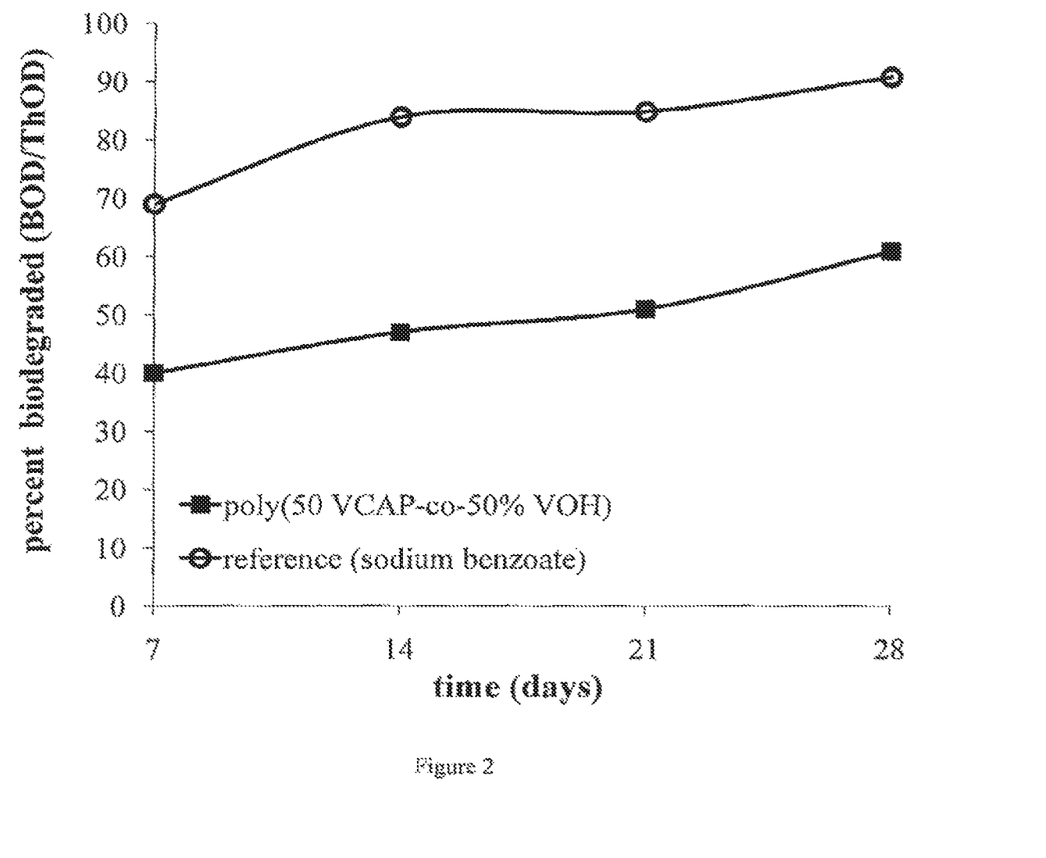
FIG. 2 is a graph of percent biodegradation for poly (66% VCAP-co-34% VOH) measured in accordance with Example 16.

Biodegradation was calculated based on measured values after 7, 14, 21, and 28 days (FIG. 2). The biodegradation of poly (66% VCAP-co-34% VOH) after 28 days was calculated to be 76%. OECD Guideline 306 provides an indication of biodegradation in seawater when the calculated biodegradation exceeds 60%, and poly (70% VCAP-co-30% VOID is believed to be degradable in a marine environment.

Method 1: Measurement of Kinetic Gas Hydrate Inhibition

The following steps were employed to measure the kinetic gas hydrate inhibition of polymerization products of this invention:

1. A 500 mL, 316 stainless steel autoclave vessel, equipped with a thermostated cooling jacket, sapphire window, inlet and outlet ports, platinum resistance thermometer (PRT), and a magnetic stirring pellet was selected. The autoclave was rated for use between −25° C. to 400° C. Temperature and pressure data were recorded by a thermocouple and pressure transducer, respectively, and recorded by computer data acquisition software. The cell contents were visually monitored by a boroscope video camera connected to a time lapsed video recorder.
2. The rig was cleaned using prior to running blank or test solutions:
   a. An air drill with a wet emery-paper buffer head was used to passivate the interior stainless steel surface wall of the rig.
   b. The vessel was then rinsed several times with double distilled water and dried with lint-free tissue.
3. Approximately 200 g of gas hydrate inhibitor solution, made in double-distilled water, were added to the rig to produce a defined concentration (e.g., 0.5%, 0.6%, 0.75%). The rig top was replaced and tightened.
4. The solution was stirred by a magnetic stirrer at 500 rpm.
5. Then, the autoclave was purged with an experimental hydrocarbon test mixture (Green Canyon Gas) (Table 1) for 60 seconds.
6. The system was pressurized to a defined pressure (e.g., 35 bar, 60 bar) at room temperature.
7. After pressurization, the temperature was reduced from room temperature to a defined chill temperature (e.g., 4° C., 7° C.) (see step 11). The reactor pressure was maintained with Green Canyon Gas as the solution temperature was reduced.
8. The pressure and temperature data logging devices were activated.
9. The rig was maintained at the defined chill temperature and pressure until gas hydrates were detected.
10. Hydrate formation in the rig was determined by any one of three indicators: (1) visual detection of hydrate crystals (i.e., non-clear solution), (2) a decrease in vessel pressure due to gas uptake by the solution, or (3) an increase in solution temperature created by the exothermic gas hydrate reaction.

11. A commercial software package, pvtsim (Calsep A/S, Lyngby, Denmark) was used to predict the Green Canyon Gas equilibrium melting temperature. For test pressures of 35 bar and 60 bar, the equilibrium melting temperatures are about 13.5° C. and 17.3° C., respectively. The kinetic gas hydrate inhibition tests were conducted 35 bar and 4° C.; and 60 bar and 7° C. in order to create subcooling temperatures ($\Delta T_{sc}$) of 9.5° C. and 10.5° C., respectively. (Subcooling temperature is the difference between the equilibrium melting temperature and the experimental fluid temperature.)

12. Gas hydrate inhibition efficiency is proportional to the induction time, which is the time from the start of the run (viz., step 8) to the time when gas hydrates are detected (viz., step 10).

TABLE 1

Composition of the experimental hydrocarbon gas mixture composition.

| component | amount |
|---|---|
| nitrogen | 0.39 |
| methane | 87.26 |
| ethane | 7.57 |
| propane | 3.10 |
| iso-butane | 0.49 |
| N-butane | 0.79 |
| iso-pentane | 0.20 |
| N-pentane | 0.20 |
| total | 100.00 |

Examples 17-30

Gas Hydrate Inhibition Measurement

Method 1 was used to measure the gas hydrate inhibition for compositions of this invention.

Excellent gas hydrate inhibition, with induction times in excess of 2,800 minutes (48 hours), were achieved by compositions of this invention (Table 2).

TABLE 2

Gas hydrate inhibition results

| ex. | sample | composition | solvent | Active level (%) | $\Delta T_{sc}$* (° C.) | induction time (min) |
|---|---|---|---|---|---|---|
| 17 | Example 1 | 95% VCAP-co-5% HEMA | BGE | 0.6 | 10.5 | >2880 |
| 18 | Example 1 | 95% VCAP-co-5% HEMA | BGE | 0.5 | 9.5 | >2880 |
| 19 | Example 3 | 82% VCAP-co-18% VOH | MeOH/H$_2$O | 0.6 | 10.5 | >2880 |
| 20 | Example 4 | 82% VCAP-co-18% VOH | MeOH/H$_2$O | 0.6 | 10.5 | >2880 |
| 21 | Example 5 | 82% VCAP-co-18% VOH | MeOH/H$_2$O | 0.6 | 10.5 | >2880 |
| 22 | Example 6 | 82% VCAP-co-18% VOH | BGE/H$_2$O | 0.6 | 10.5 | >2880 |
| 23 | Example 7 | 82% VCAP-co-18% VOH | BGE/H$_2$O | 0.6 | 10.5 | >2880 |
| 24 | Example 7 | 82% VCAP-co-18% VOH | BGE/H$_2$O | 0.3 | 10.5 | >2800 |
| 25 | Example 8 | 82% VCAP-co-18% VOH | BGE | 0.6 | 10.5 | >2800 |
| 26 | Example 8 | 82% VCAP-co-18% VOH | BGE | 0.3 | 10.5 | >2800 |
| 27 | Example 11 | 82% VCAP-co-18% VOH | IPA/H$_2$O | 0.6 | 10.5 | >2800 |
| 28 | Example 12 | 74% VCAP-co-26% VOH | BGE/H$_2$O | 0.6 | 10.5 | >2800 |
| 29 | Example 13 | 66% VCAP-co-34% VOH | BGE/H$_2$O | 0.6 | 10.5 | >2800 |
| 30 | Example 14 | 66% VCAP-co-34% VOH | BGE/H$_2$O | 0.6 | 10.5 | 2800 |

*$\Delta T_{sc}$: subcooling temperature difference

While the invention has been described with particular reference to certain embodiments thereof, it will be understood that changes and modifications may be made which are within the skill of the art. Accordingly, it is intended to be bound only by the following claims:

What is claimed is:

1. A method for preventing, retarding, and/or reducing the formation and/or growth of gas hydrates that comprises:

(I) providing a polymer having the following structure:

wherein m and n are molar ratios, the sum of which equals 100%; and (II) introducing a composition comprising the polymer into a petroleum-containing fluid, having from about 0.01% to about 3% of the polymer, based on the weight of the water present in the petroleum-containing fluid, wherein the K-value of the polymer ranges from about 5 to about 40.

2. The method according to claim 1, wherein the Weight ratio of the N-vinyl-2-caprolactam in the polymer ranges from about 5% to about 95% and the weight ratio of the vinyl acetate in the polymer ranges from about 5% to about 95%.

3. The method according to claim 2, wherein the weight ratio of the N-vinyl-2-caprolactam in the polymer ranges from about 10% to about 0% and the weight ratio of the vinyl acetate in the polymer ranges from about 10% to about 90%.

4. The method according to claim 1, wherein the molecular weight of the polymer ranges from about 1,500 to about 4,000 Daltons.

5. The method according to claim 1, wherein the K-value of the polymer ranges from about 10 to about 30.

\* \* \* \* \*